J. D. Blake,

Soap-Holder,

N° 77,442.   Patented May 5, 1868.

Witnesses:
A S Van Franken
Wm Frank Browne

Inventor:
J D Blake
By his Atty
J S Brown

United States Patent Office.

J. D. BLAKE, OF LACONIA, ASSIGNOR TO HIMSELF AND J. A. SANBORN, OF HOLDERNESS, NEW HAMPSHIRE

Letters Patent No. 77,442, dated May 5, 1868.

IMPROVED SOAP-STAND.

The Schedule referred to in these Letters Patent and making part of the same.

TO ALL WHOM IT MAY CONCERN:

Be it known that I, J. D. BLAKE, of Laconia, in the county of Belknap, and State of New Hampshire, have invented an Improved Soap-Stand; and I do hereby declare that the following is a full and exact description thereof, reference being had to the accompanying drawings, making part of this specification—

Figure 1:
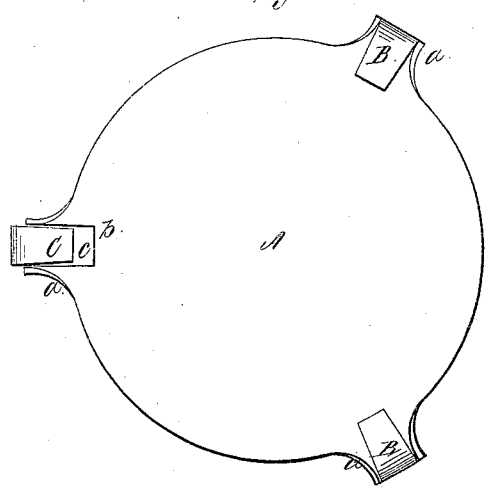

Figure 1 being a top view of the invention.

Figure 2:
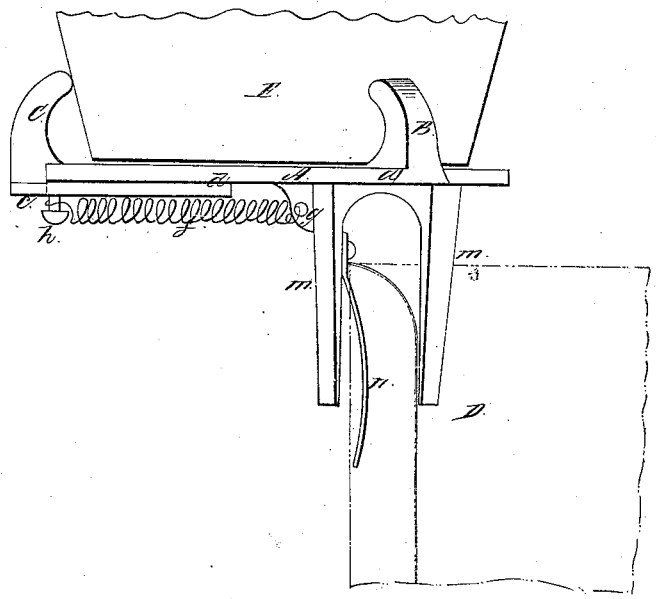

Figure 2, a side view of the same, showing its mode of application and use.

Like letters designate corresponding parts in both figures.

The object of this invention is to furnish a stand by which a bowl or dish containing soft soap, or other soap, may be held in a convenient situation near a wash-tub.

The invention consists substantially of a horizontal plate, A, of sufficient size to receive the bottom of the bowl or dish, (indicated by red lines, F, fig. 2,) provided with two (or more) stationary lugs or clips, B B, and a movable clip, C, for holding the dish on the plate, and with clamp-lugs m m, and spring n, or screw, or other equivalent, for attaching it to the tub, (D, fig. 2, in red lines.)

The disk A is preferably of circular form, and the clips B B and C are best attached to projections a a from the periphery of the plate. The clips may be of hooked form, as shown. The movable clip C, employed for the purpose of inserting and taking out the bowl or dish to be held, moves radially in and out in a notch, b, in the edge of the plate A, and it has a dove-tail flanch, c, sliding in ledges or ways, d, under the plate A. It is drawn inward against the bowl or dish by a spring, f, under the plate, connected with the same at g, and with the clip at h.

Any unessential variation from the above construction may be used.

What I claim as my invention, and desire to secure by Letters Patent, is—

The base-plate A, provided with stationary clips B B, movable clip C, and clamp-lugs m m, together composing a soap-stand, substantially as herein specified.

The above specification of my improved soft-soap stand signed by me, this 24th day of February, 1868.

J. D. BLAKE.

Witnesses:
JAS. H. TILTON,
S. S. WIGGIN.